Nov. 28, 1933.    T. G. RENNERFELT    1,936,858
FRICTION GEARING
Filed June 12, 1933

INVENTOR
Ture Gustaf Rennerfelt

Patented Nov. 28, 1933

1,936,858

UNITED STATES PATENT OFFICE 1,936,858

FRICTION GEARING

Ture Gustaf Rennerfelt, Stockholm, Sweden

Application June 12, 1933, Serial No. 675,420, and in Sweden January 14, 1933

5 Claims. (Cl. 29—84)

My invention relates to improvements in friction gearing for transmission of power of the type comprising a track, a pinion, a plurality of rollers pressed between the pinion and the track, and a plurality of secondary rollers or disks rotatably mounted on a shaft, and in contact with the rollers. The invention relates also to a method of producing or of assembling such a gearing. The pressure on the rollers in such a gear is very great so that after they are assembled within the track their positions cannot be adjusted without damage to their rolling faces. The object of my invention is to provide a method of assembling the gearing so as to place all the rollers together with the pinion in correct positions within the track, so that no roller shall become idle, each roller shall take its proper share of the load, each disk shall make contact with a roller, and no damage shall be done to roller or pinion.

Figure 1:
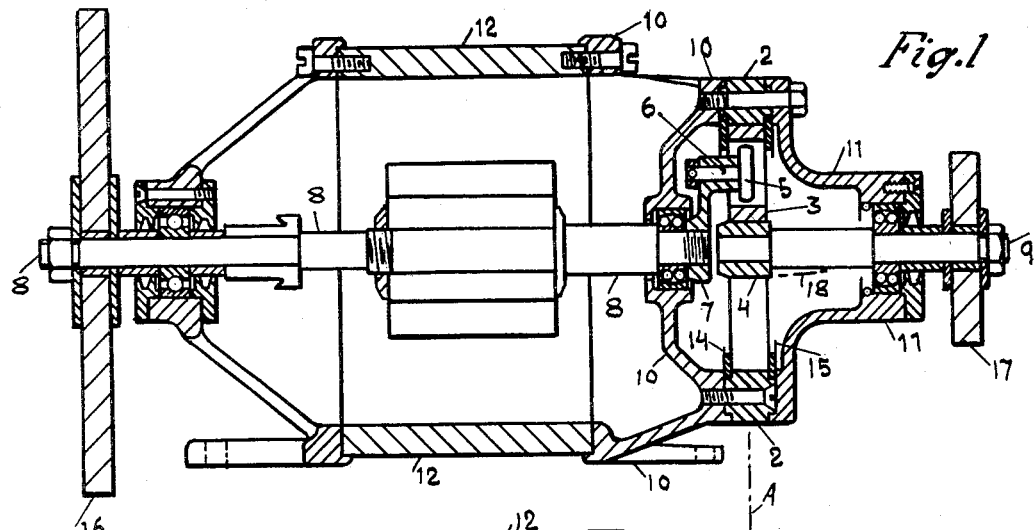
Figure 2:
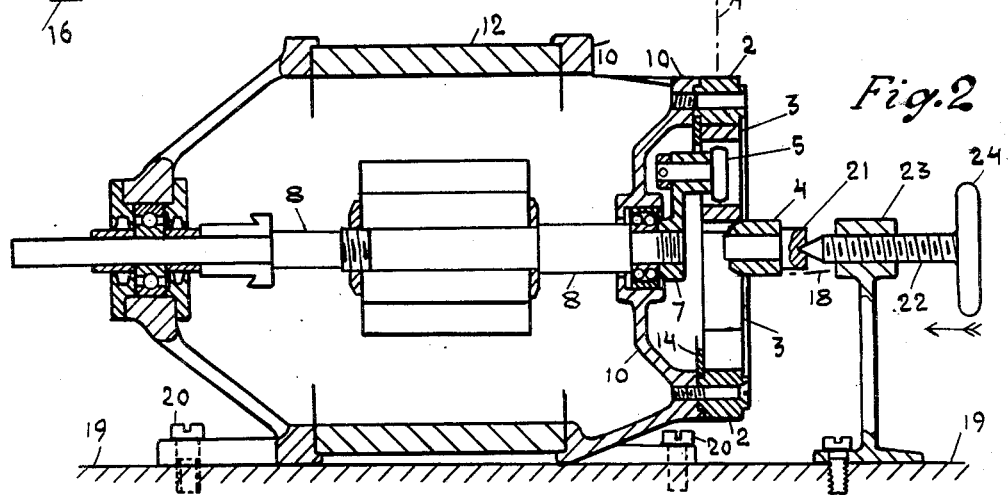
Figure 3:
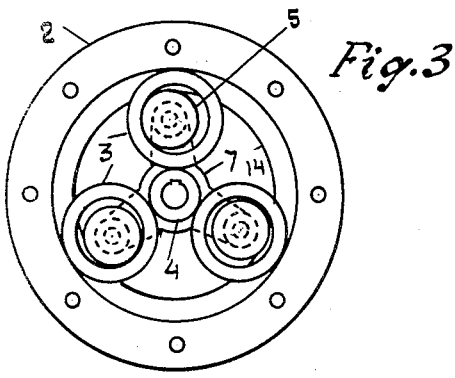
Figure 4:
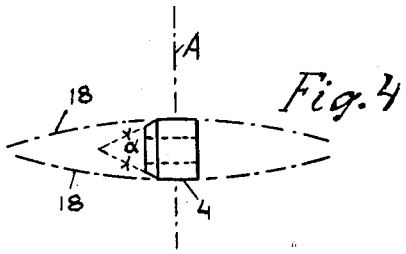

The invention is illustrated in the accompanying drawing in which Fig. 1 shows a section of the gearing applied to an electric motor for increasing its speed. Fig. 2 shows the method of assembling the same gearing. Fig. 3 is an end view of the gearing. Fig. 4 is a detached view of the pinion. In the drawing 2 denotes the track, 3 the rollers; 4 the pinion, 5 the disks or secondary rollers rotatably mounted by means of studs 6 in a yoke 7 which is fastened to the motor shaft 8. The pinion is keyed to a spindle 9. To the track are fastened a bearing block 10 for the shaft, and a bearing block 11 for the spindle. The parts 2, 10 and 11 form together an oiltight casing. The studs 6 are lubricated in known manner, for instance as shown in Patent 1,757,476. The motor frame is denoted with 12. The rollers and pinion are made of hardened steel; the track may be of casehardened iron with ground rolling face. On each side of the rollers is located a flange 14, 15 made of hardened steel, though in some cases the said flanges may be formed integrally with the bearing blocks. The length of a roller is a trifle less than the distance between the flanges 14, 15. In Fig. 1 is shown a large emery wheel on the shaft, and a smaller one on the spindle. The rollers of cylindrical shape are either solid or as shown in the drawing, hollow as rings with a cross section corresponding to the pressure to which they are exposed. The disks 5 are located either within the rollers or between them. The pinion is ground with a diameter so large that it must be pressed in between the rollers so that the rollers become to a certain amount compressed and thus become exposed to a pressure of certain magnitude and so high that in the operation of the gearing slipping between pinion and rollers shall never occur even in the case of great overload. The proper diameter of the pinion is best determined by first measuring how much a roller actually becomes compressed by a pressure of certain magnitude. To facilitate the entrance of the pinion between the rollers the end of the pinion is conical or bevelled to a small angle $\alpha$ Fig. 4. The pinion is either cylindrical or formed as an oval or elliptical roller so that the generatrix of its rolling face is an arc of a circle 18 with very large radius as shown in Fig. 4. A pinion of this form will cause a greater compression of the rollers at their middle plane A than at their ends, and is preferred in some cases when the speed is very high.

The gearing is assembled in the following manner: The shaft 8 together with its disks 5 is mounted so that it coincides with the centre line of the track as shown in Fig. 2, and the track is secured to a support 19 as by bolts 20. The rollers 3 are placed within the track, and the shaft is brought to rotate, as by sending current through the motor, so that each disk comes into contact with a roller. The speed of rotation of the shaft must be sufficiently high so that the rollers are brought by the centrifugal force into contact with the track. The pinion 4 is then placed on a mandrel 21, arranged to rotate on the end of the screw 22, which is threaded in the bracket 23 and provided with a handle 24. The bevelled end of the pinion is entered between the edges of the rotating rollers, and by means of the screw pressure in direction of the arrow is brought upon the mandrel. The pinion is then caused to rotate by reason of its contact with the rollers. A continued and moderate pressure from the screw will, without damage to the rollers, bring the pinion into the position between the rollers which is shown in Fig. 1. Since the pinion was ground to a certain diameter, designed to cause a certain deflection of the rollers, there will now exist the desired pressure between the pinion and the rollers. The mandrel is now removed from the pinion, and the spindle together with its bearing 11 are applied. In this gearing each roller will take its proper share of the load, and there will be equal pressures on the different studs 6. The disks 5 need not all be of exactly the same diameter, the studs need not be exactly parallel with the shaft, and the angular distances between the studs need not be exactly equal.

The above described method may be modified, and still fall within the scope of my claims. Instead of fastening the track to the bearing block the track may be laid flat on a support, and the necessary rotation of the shaft with its disks may be effected by connecting the shaft to the spindle of a drill press or similar machine. The spindle 94 may be integral with the pinion. This gearing gives a high efficiency, and can be used also for decreasing the speed of a shaft.

Having thus described my invention, what I claim is:

1. The method of producing a friction gearing comprising a track, a plurality of rollers, a pinion and a plurality of disks rotatably mounted on a shaft, which consists in bringing each disk into contact with a roller, bringing all the rollers into contact with the track, and pressing the pinion in between the rollers.

2. The method of producing a friction gearing comprising a track, a plurality of rollers, a pinion, and a plurality of disks rotatably mounted on a shaft, which consists in mounting the shaft so that it coincides with the centre line of the track, placing the rollers within the track, rotating the shaft so that each disk is brought into contact with a roller and so that all the rollers are brought into contact with the track, and pressing the pinion in between the rollers.

3. The method of producing a friction gearing comprising a track, a plurality of rollers, a pinion, and a plurality of disks rotatably mounted on a shaft, which consists in fastening the track to a bearing of the shaft, placing the rollers within the track, rotating the shaft so that each disk is brought into contact with a roller, and so that all the rollers are brought into contact with the track, and pressing the pinion in between the rollers.

4. The method of producing a friction gearing comprising a track, a plurality of rollers, a pinion, and a plurality of disks rotatably mounted on a shaft, which consists in fastening the track to a bearing of the shaft, placing the rollers within the track, rotating the shaft so that each disk is brought into contact with a roller, and so that all the rollers are brought into contact with the track, causing the pinion to rotate, and pressing the pinion in between the rollers.

5. The method of producing a friction gearing comprising a track, a plurality of rollers, a pinion, and a plurality of disks rotatably mounted on a shaft, which consists in giving to the pinion such diameter that the pinion when assembled together with the rollers within the track will cause a definite deflection of the rollers, bringing each disk into contact with a roller, bringing all the rollers into contact with the track, causing the pinion to rotate, and pressing it while rotating in between the rollers.

TURE GUSTAF RENNERFELT.